(12) United States Patent
Easton et al.

(10) Patent No.: US 10,476,253 B2
(45) Date of Patent: Nov. 12, 2019

(54) POWER PEDESTAL INCLUDING ADJUSTABLE GROUND FAULT PROTECTION

(71) Applicant: EATON CORPORATION, Cleveland, OH (US)

(72) Inventors: Jason Demetrios Easton, Williamsburg, VA (US); Chris Emmons Drueke, Williamsburg, VA (US); Paul David Seff, Williamsburg, VA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 563 days.

(21) Appl. No.: 15/041,376

(22) Filed: Feb. 11, 2016

(65) Prior Publication Data
US 2017/0237251 A1    Aug. 17, 2017

(51) Int. Cl.
H02H 3/00    (2006.01)
H02H 3/16    (2006.01)

(52) U.S. Cl.
CPC ..................... *H02H 3/16* (2013.01)

(58) Field of Classification Search
USPC ......................................... 361/42
See application file for complete search history.

(56) References Cited

U.S. PATENT DOCUMENTS

| | | | | |
|---|---|---|---|---|
| 4,347,541 A * | 8/1982 | Chen | ...................... | H02H 3/006 361/105 |
| 5,184,279 A * | 2/1993 | Horn | ........................ | H02B 1/50 174/38 |
| 5,486,664 A * | 1/1996 | Lamp | ...................... | H01H 9/04 200/297 |
| 5,587,862 A * | 12/1996 | Frank, Sr. | ............... | F21V 21/06 361/42 |
| 5,982,593 A * | 11/1999 | Kimblin | .................. | H02H 3/335 324/424 |
| 6,266,233 B1 * | 7/2001 | O'Regan | ................... | H02B 1/50 174/38 |
| 6,844,716 B1 | 1/2005 | Lundberg et al. | | |
| 2005/0286184 A1 * | 12/2005 | Campolo | .............. | H01R 25/003 361/42 |
| 2007/0121268 A1 * | 5/2007 | Terhorst | ................. | H01H 71/62 361/115 |
| 2007/0132531 A1 * | 6/2007 | Elms | ..................... | H02H 1/0015 335/18 |
| 2007/0285266 A1 * | 12/2007 | Angle | ................. | G01R 31/3277 340/638 |

(Continued)

*Primary Examiner* — Ronald W Leja
(74) *Attorney, Agent, or Firm* — Eckert Seamans Cherin & Mellott, LLC

(57) ABSTRACT

A power pedestal including a receptacle, a circuit breaker electrically connected between a power source and the receptacle and including separable contacts structured to trip open and electrically disconnect the receptacle from the power source, a current sensor structured to detect current flowing to the receptacle, and a ground fault detection device structured to sense a ground fault based on an output of the current sensor and to control the circuit breaker to trip open the separable contacts in response to detecting the ground fault. The ground fault detection device has an adjustable range of ground fault protection.

9 Claims, 3 Drawing Sheets

(56) References Cited

U.S. PATENT DOCUMENTS

| | | | |
|---|---|---|---|
| 2008/0140565 A1* | 6/2008 | DeBenedetti | G06Q 20/10 705/39 |
| 2008/0253061 A1* | 10/2008 | Seff | H02B 1/50 361/622 |
| 2009/0040666 A1* | 2/2009 | Elms | H02H 1/0015 361/42 |
| 2009/0086387 A1* | 4/2009 | Engel | H02H 1/0015 361/42 |
| 2011/0007443 A1* | 1/2011 | Crookham | H02H 3/347 361/93.2 |
| 2012/0147507 A1* | 6/2012 | Rivers, Jr. | H02J 3/1828 361/42 |
| 2013/0015707 A1* | 1/2013 | Redmann | H02J 7/0027 307/39 |
| 2014/0211345 A1* | 7/2014 | Thompson | B60L 11/1816 361/42 |
| 2015/0066227 A1* | 3/2015 | Chapel | H04L 12/4633 700/295 |
| 2015/0138677 A1* | 5/2015 | Cudak | H02H 3/16 361/42 |
| 2017/0237251 A1* | 8/2017 | Easton | H02H 3/16 361/42 |

\* cited by examiner

POWER PEDESTAL INCLUDING ADJUSTABLE GROUND FAULT PROTECTION

BACKGROUND

Field of the Invention

The disclosed concept pertains generally to power pedestals and, more particularly, to marina power pedestals.

Background Information

U.S. Pat. No. 6,844,716 discloses a utility distribution pedestal for marine and recreational vehicles. Known power pedestals includes receptacles that can be used to provide power to marine or recreational vehicles. Some known power pedestals include ground fault circuit interrupters (GFCIs) that provide ground fault protection for the receptacles. However, the level of ground fault protection provided by the GFCIs is fixed. Additionally, the maximum rating of the GFCIs used in known power pedestals is 50 A.

As codes change, such as the NEC 555.3 code, GFCIs that were previously used may not provide a level of ground protection that is required by the new code. Additionally, the previously used GFCIs cannot accommodate applications where greater than 50 A of current is required.

There is thus room for improvement in power pedestals.

SUMMARY

These needs and others are met by embodiments of the disclosed concept wherein a power pedestal includes a ground fault detection device with an adjustable range of ground fault protection.

In accordance with one aspect of the disclosed concept, a power pedestal comprises: a receptacle; a circuit breaker electrically connected between a power source and the receptacle and including separable contacts structured to trip open and electrically disconnect the receptacle from the power source; a current sensor structured to sense current flowing to the receptacle; and a ground fault detection device structured to detect a ground fault based on an output of the current sensor and to control the circuit breaker to trip open the separable contacts in response to detecting the ground fault, wherein the ground fault detection device has an adjustable range of ground fault protection.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "vehicle" shall expressly include, but not be limited by, a land vehicle, a marine vehicle, an air vehicle or another motor vehicle.

As employed herein, the term "land vehicle" shall expressly include, but not be limited by, any land-based vehicles having pneumatic tires, any rail-based vehicles, any maglev vehicles, automobiles, cars, trucks, station wagons, sport-utility vehicles (SUVs), recreational vehicles, construction vehicles, off road vehicles, all-terrain vehicles, farm vehicles, fleet vehicles, motor homes, vans, buses, motorcycles, mopeds, campers, trailers, or bicycles.

As employed herein, the term "marine vehicle" shall expressly include, but not be limited by, any water-based vehicles, ships, boats, other vessels for travel on water, submarines, or other vessels for travel under water.

As employed herein, the term "air vehicle" shall expressly include, but not be limited by, any air-based vehicles, airplanes, jets, aircraft, airships, balloons, blimps, or dirigibles.

As employed herein, the term "number" shall mean one or an integer greater than one (i.e., a plurality).

As employed herein, the term "platform" shall mean a horizontal flat surface, a raised horizontal flat surface, or a dock pier.

As employed herein, the term "pedestal" or "pedestal member" shall mean an elongated, generally upright structure.

As employed herein, the term "power pedestal" shall mean a pedestal or pedestal member structured to input power from input power terminals (e.g., utility power terminals) and output power to a number of output power receptacles.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with a marina power pedestal, although the disclosed concept is applicable to a wide range of vehicle power pedestals.

Figure 1:
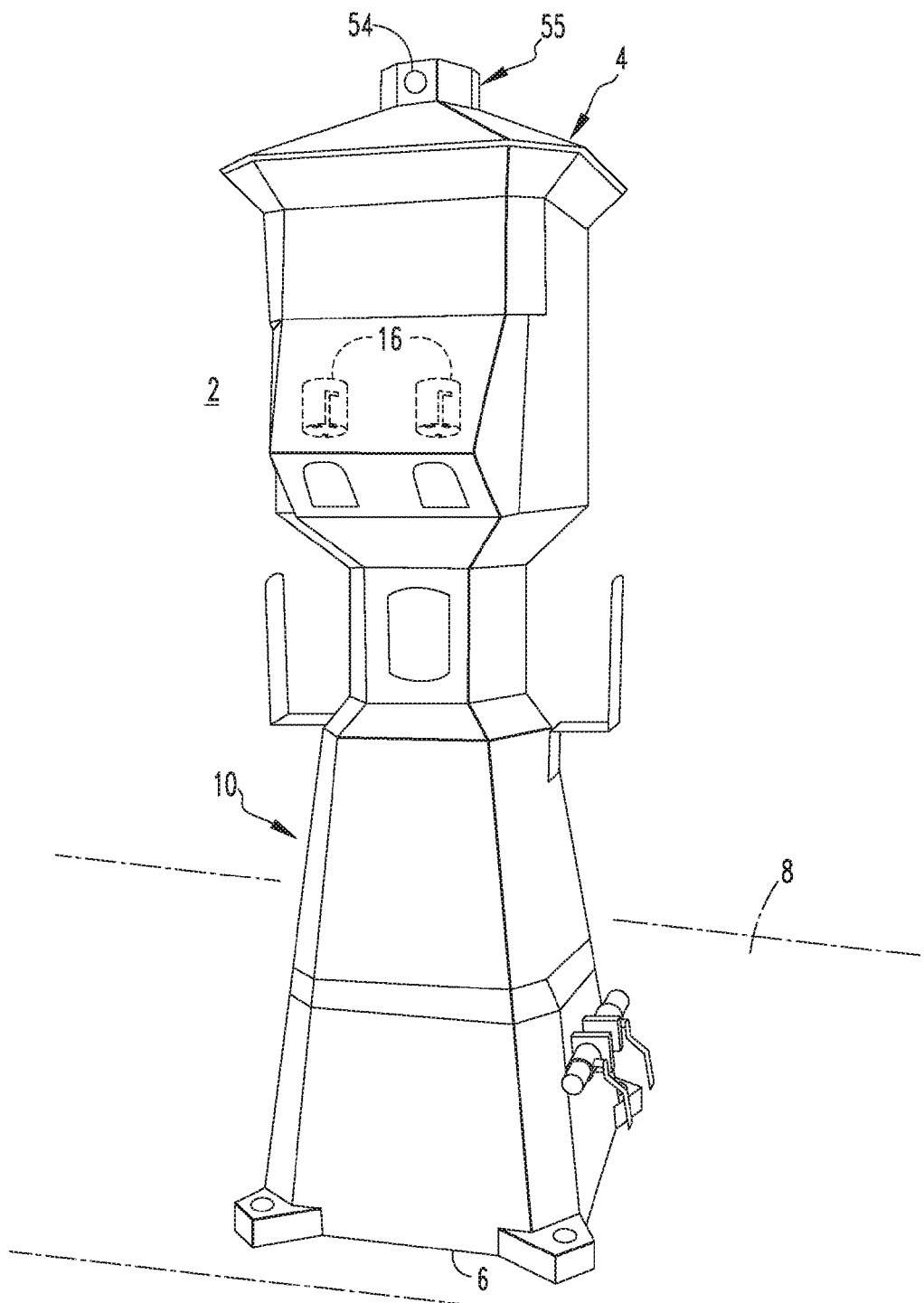
FIG. 1 is an isometric view of a marina power pedestal in accordance with embodiments of the disclosed concept.
Figure 2:
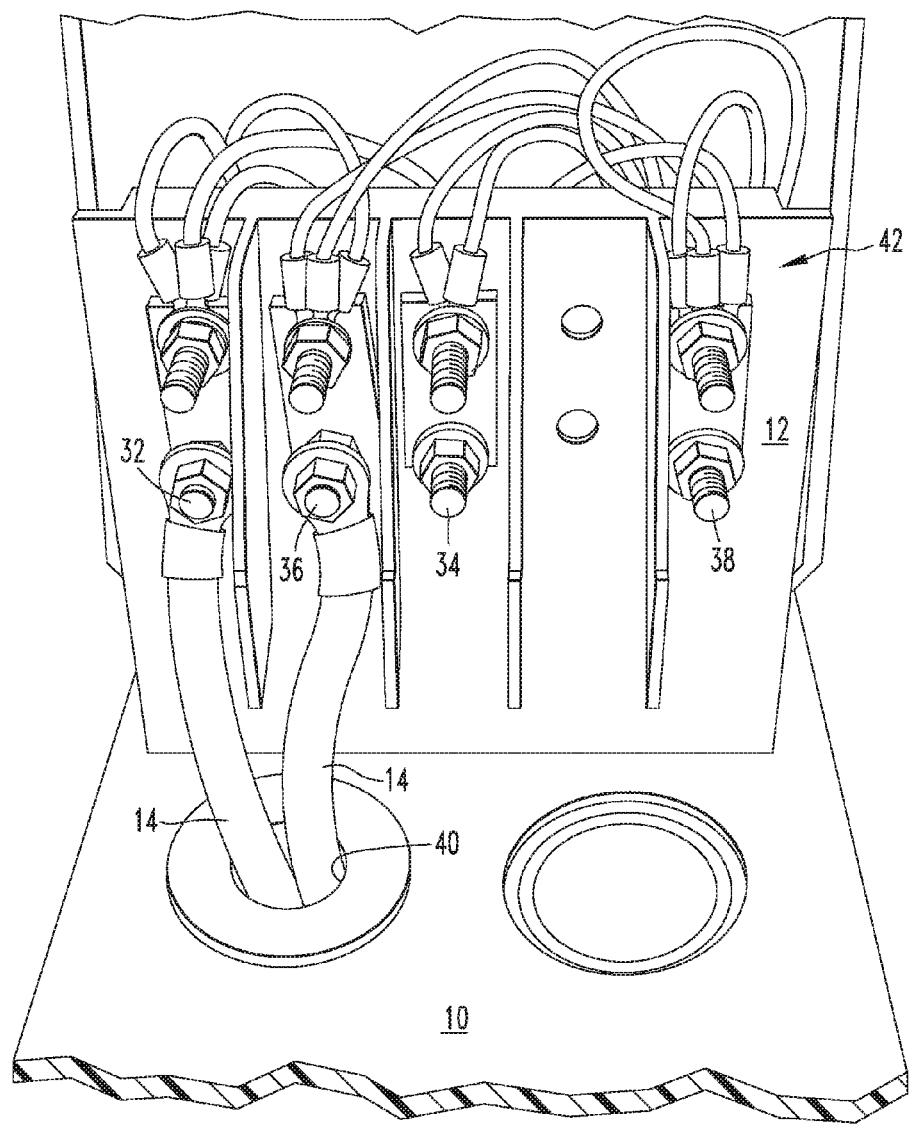
FIG. 2 is an isometric view of the input power terminals of the marina power pedestal of FIG. 1.

Referring to FIGS. 1 and 2, a power pedestal, such as, for example and without limitation, a marina power pedestal 2 includes a pedestal member 4 having a base 6 structured to be mounted or fixed to a mounting member, such as, for example and without limitation, a platform. In the example shown, the platform is a dock pier 8 (shown in phantom line drawing) and an enclosure 10 extending generally vertically from the base 6. A plurality of input power terminals 12 (shown in FIG. 2) are mounted to the pedestal member 4 and are structured to be electrically connected to a power source (e.g., a utility power source) (not shown) by plural electrical conductors 14 (shown in FIG. 2). The marina power pedestal 2 also includes a number of output power receptacles 16 mounted to the enclosure 10. The marina power pedestal 2 further includes a ground fault protection circuit which will be described in more detail with reference to FIG. 4. The marina power pedestal 2 is structured to provide electrical power to vehicles or devices that are electrically connected to the marina power pedestal 2 via the output power receptacles 16.

The power pedestal 2 further includes an indicator 54. The indicator 54 is structured to provide an indication to a person outside the enclosure 10 of the power pedestal 2. In some example embodiments of the disclosed concept, the indication is a visual indication and the indicator 54 may be a light source such as, for example and without limitation, a light emitting diode (LED). In further example embodiments of the disclosed concept, the indicator 54 can provide different color indications and may be a multi-color light source such as, without limitation, a multi-color LED. The indicator 54 may also include multiple light sources such as, without limitation, multiple LEDs of different colors.

Referring to FIG. 2, the input power terminals 12 of the marina power pedestal 2 of FIG. 1 are shown. These terminals 12 include a first line terminal 32 (LINE1), a second line terminal 34 (LINE2), a neutral terminal 36 and a ground terminal 38. As shown by the two example electrical conductors 14, the terminals 32,34,36,38 are structured to be electrically connected to a suitable power source (not shown) by those conductors 14, which extend through the opening 40. It will be appreciated that the other terminals 34,38 may also be electrically connected to the power source by other electrical conductors (not shown). Additional electrical conductors 42 electrically connect the terminals 32,34, 36,38 to other components such as, without limitation, the output power receptacles 16 or the ground fault protection circuit of FIG. 4.

Figure 3:
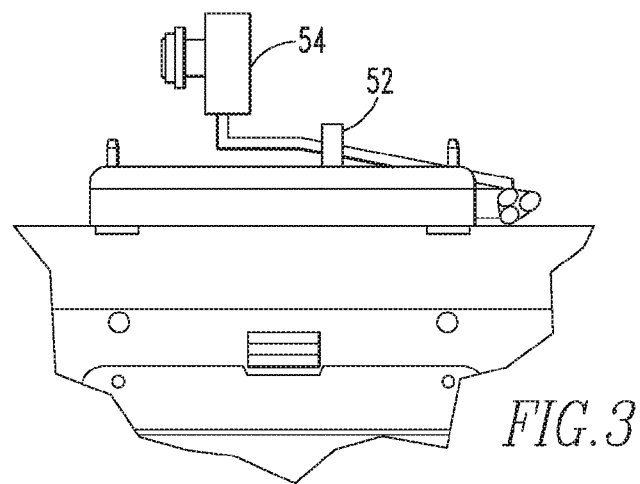
FIG. 3 is a view of an indicator in accordance with example embodiments of the disclosed concept.

FIG. 3 is an enlarged view of a portion of an upper housing 55 (shown in FIG. 1) of the power pedestal 2 in accordance with an example embodiment of the disclosed concept, shown with the cover removed to illustrate internal components that would otherwise be enclosed and thus hidden. In the example embodiment of FIG. 3, the indicator 54 is a light source such as, without limitation, an LED. FIG. 3 shows the area inside the power pedestal 2 where the indicator 54 is located. Since the indicator 54 is located in a top portion of the power pedestal 2, it is easy to see when it is illuminated. Also, the upper housing 55 of the power pedestal 2 includes transparent or translucent exterior panels so that light from the indicator 54 can be seen from outside the power pedestal 2.

In some example embodiments of the disclosed concept, the power pedestal 2 further includes a photocell 52. The photocell 52 provides ambient light detection which can be used to turn off lights on the power pedestal 2 when it is light outside in order to save power.

Figure 4:
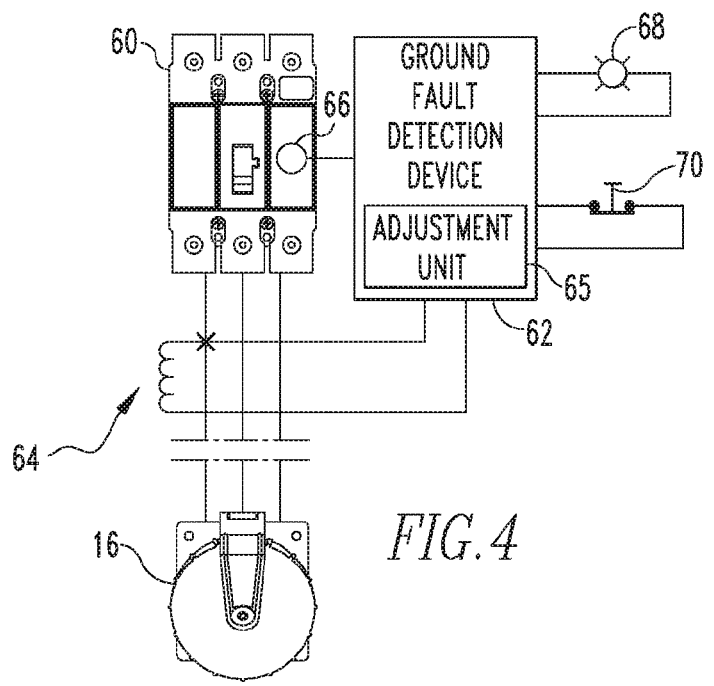
FIGS. 4 and 5 are schematic diagrams of a ground fault protection circuit in accordance with embodiments of the disclosed concept.
Figure 5:
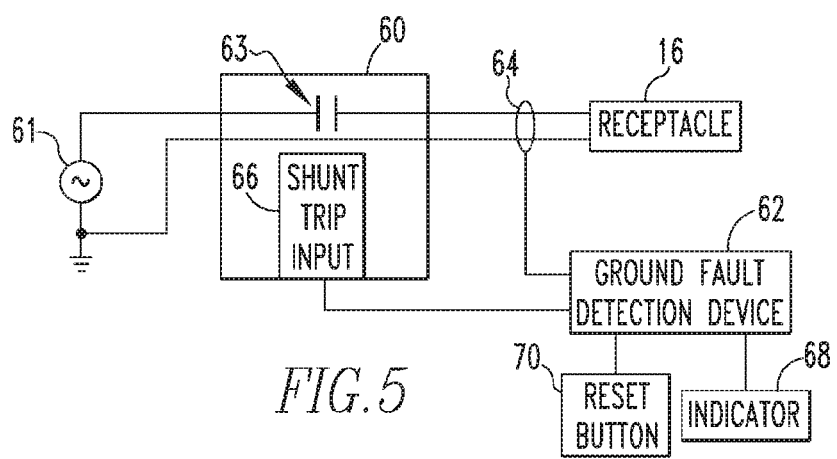

FIGS. 4 and 5 are schematic diagrams of a ground fault protection circuit in accordance with an example embodiment of the disclosed concept. Referring to FIG. 4, the ground fault protection circuit includes a circuit breaker 60, a ground fault detection device 62, and a current sensor 64. The circuit breaker 60 is electrically connected between a power source 61 (shown in FIG. 5) and one of the output power receptacles 16 of the power pedestal 2. The circuit breaker 60 includes separable contacts 63 (shown in FIG. 5) that are structured to trip open and electrically disconnect the output power receptacle 16 from the power source. In some example embodiments of the disclosed concept, the circuit breaker 60 is a thermal/magnetic type circuit breaker. In some example embodiments of the disclosed concept, the circuit breaker 60 has a rating above 50 A.

The current sensor 64 is structured to sense current flowing to and from the output power receptacle 16. The current sensor 64 may be any suitable type of current sensor. In some example embodiments of the disclosed concept, the current sensor 64 is a current transformer. Also, in some example embodiments of the disclosed concept, the current sensor 64 is a zero sequence current transformer. The current sensor 64 is electrically connected to the ground fault detection device 62 so as to output the sensed current to the ground fault detection device 62.

The ground fault detection device 62 is structured to detect a ground fault based on the sensed current output from the current sensor 64. The ground fault detection device 62 may use any suitable method for detecting a ground fault. The ground fault detection device 62 is also structured to control the circuit breaker 60 to trip open its separable contacts 63 in response to detecting the ground fault. In some example embodiments of the disclosed concept, the ground fault detection device 62 is electrically connected to a shunt trip input 66 of the circuit breaker 60 and outputs a signal to the shunt trip input 66 to control the circuit breaker 60 to trip open its separable contacts 63.

The ground fault detection device 62 has an adjustable range of ground fault protection. That is, the ground fault detection device 62 can be adjusted to provide different levels of ground fault protection. In some example embodiments of the disclosed concept, the ground fault detection device 62 has an adjustable range of about 5 mA to about 100 mA. In other words, the ground fault detection device 62 can be adjusted to detect a ground fault when a ground fault current exceeds 100 mA, when a ground fault current exceeds 5 mA, or any other selected level in between. Although about 5 mA to about 100 mA is an example of one adjustable range that the ground fault detection device 62 may have, it will be appreciated by those having ordinary skill in the art that the adjustable range of the ground fault detection device 62 may be any suitable adjustable range without departing from the scope of the disclosed concept.

In some example embodiments of the disclosed concept, the ground fault detection device 62 includes an adjustment unit 65 (shown in FIG. 4). The adjustment unit 65 is structured to allow a technician to adjust the level of ground fault protection provided by the ground fault detection device 62. In some example embodiments of the disclosed concept, the adjustment unit 65 includes an adjustable member such as, without limitation, a dial or a dip switch, that allows the technician to the adjust the level of ground fault protection 65.

In some example embodiments of the disclosed concept, the ground fault detection device 62 is additionally electrically connected to an indicator 68 and/or a reset button 70. The ground fault detection device 62 is structured to control the indicator 68 to activate in response to detecting the ground fault. The indicator 68 can provide an indication to a technician that a ground fault has been detected and that the circuit breaker 60 has been tripped as a result of the ground fault. In some example embodiments of the disclosed concept, the indicator 68 is a light that lights up when activated. However, it will be appreciated by those having ordinary skill in the art that other types of indicators such as, for example and without limitation, audible indicators, may be employed as the indicator 68 without departing from the scope of the disclosed concept. It is further contemplated that in some example embodiments of the disclosed concept, the indicator 68

In some example embodiments of the disclosed concept, the ground fault detection device 62 is structured to reset in response to actuation of the reset button 70. Resetting the ground fault detection device 62 causes it to stop outputting the signal to the shunt trip input 66. For example and without limitation, in some example embodiments of the disclosed concept, the ground fault detection device 62 includes a relay that is closed in response to detecting a ground fault. Closing the relay causes the signal to be output to the shunt trip input 66. Actuation of the reset button 70 causes the relay to open, which in turn stops the signal from being output to the shunt trip input 66.

Known power pedestals have employed GFCIs to provide ground fault protection. The GFCIs have a fixed level of ground fault protection and the GFCIs in known power pedestals have a maximum rating of 50 A. In contrast, some example embodiments of the disclosed concept, such as the power pedestal 2 of FIG. 1, employ the ground fault protection circuit of FIGS. 4 and 5. The ground fault protection circuit includes the ground fault detection device 62 which provides an adjustable range of ground fault protection. Additionally, the circuit breaker 66 may have a rating greater than 50 A, which would allow a current of greater than 50 A to flow to the output power receptacle 16.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A power pedestal comprising:
    a receptacle;
    a circuit breaker electrically connected between a power source and the receptacle and including separable contacts structured to trip open and electrically disconnect the receptacle from the power source;
    a current sensor structured to sense current flowing to the receptacle; and
    a ground fault detection device structured to detect a ground fault based on an output of the current sensor and to control the circuit breaker to trip open the separable contacts in response to detecting the ground fault,
    wherein the ground fault detection device has an adjustable range of ground fault protection,
    wherein the circuit breaker includes a shunt trip input,
    wherein the ground fault detection device is structured to output a signal to the shunt trip input to control the circuit breaker to trip open the separable contacts in response to detecting the ground fault,
    wherein the ground fault detection device includes an adjustment unit including an adjustable member structured to allow a technician to adjust the level of ground fault protection of the ground fault detection device, and
    wherein the adjustable member is at least one of a dial and a dip switch.

2. The power pedestal of claim 1, wherein the adjustable range is a range of 5 mA to 100 mA.

3. The power pedestal of claim 1, wherein the circuit breaker is a thermal/magnetic type circuit breaker.

4. The power pedestal of claim 1, wherein the current sensor is a current transformer.

5. The power pedestal of claim 4, wherein the current transformer is a zero sequence current transformer.

6. The power pedestal of claim 1, further comprising:
    an indicator electrically connected to the ground fault relay,
    wherein the ground fault detection device is structured to control the indicator to activate in response to detecting the ground fault.

7. The power pedestal of claim 6, wherein the indicator is a light.

8. The power pedestal of claim 1, further comprising:
    a reset button electrically connected to the ground fault detection device,
    wherein the ground fault detection device is structured to reset in response to actuation of the reset button.

9. A power pedestal comprising:
    a receptacle;
    a circuit breaker electrically connected between a power source and the receptacle and including separable contacts structured to trip open and electrically disconnect the receptacle from the power source;
    a current sensor structured to sense current flowing to the receptacle; and
    a ground fault detection device structured to detect a ground fault based on an output of the current sensor and to control the circuit breaker to trip open the separable contacts in response to detecting the ground fault,
    wherein the ground fault detection device has an adjustable range of ground fault protection,
    wherein the circuit breaker includes a shunt trip input,
    wherein the ground fault detection device is structured to output a signal to the shunt trip input to control the circuit breaker to trip open the separable contacts in response to detecting the ground fault,
    wherein the circuit breaker has a rating greater than 50 A.

* * * * *